July 12, 1949.　　　　L. S. WALLE ET AL　　　　2,476,076
AUTOMATIC POLYPHASE RECLOSING CIRCUIT BREAKER
Filed April 17, 1944　　　　　　　　　　　　　2 Sheets-Sheet 1

Inventors:
Ludwig S. Walle,
Leonard J. Linde,
by Harry E. Dunham
Their Attorney.

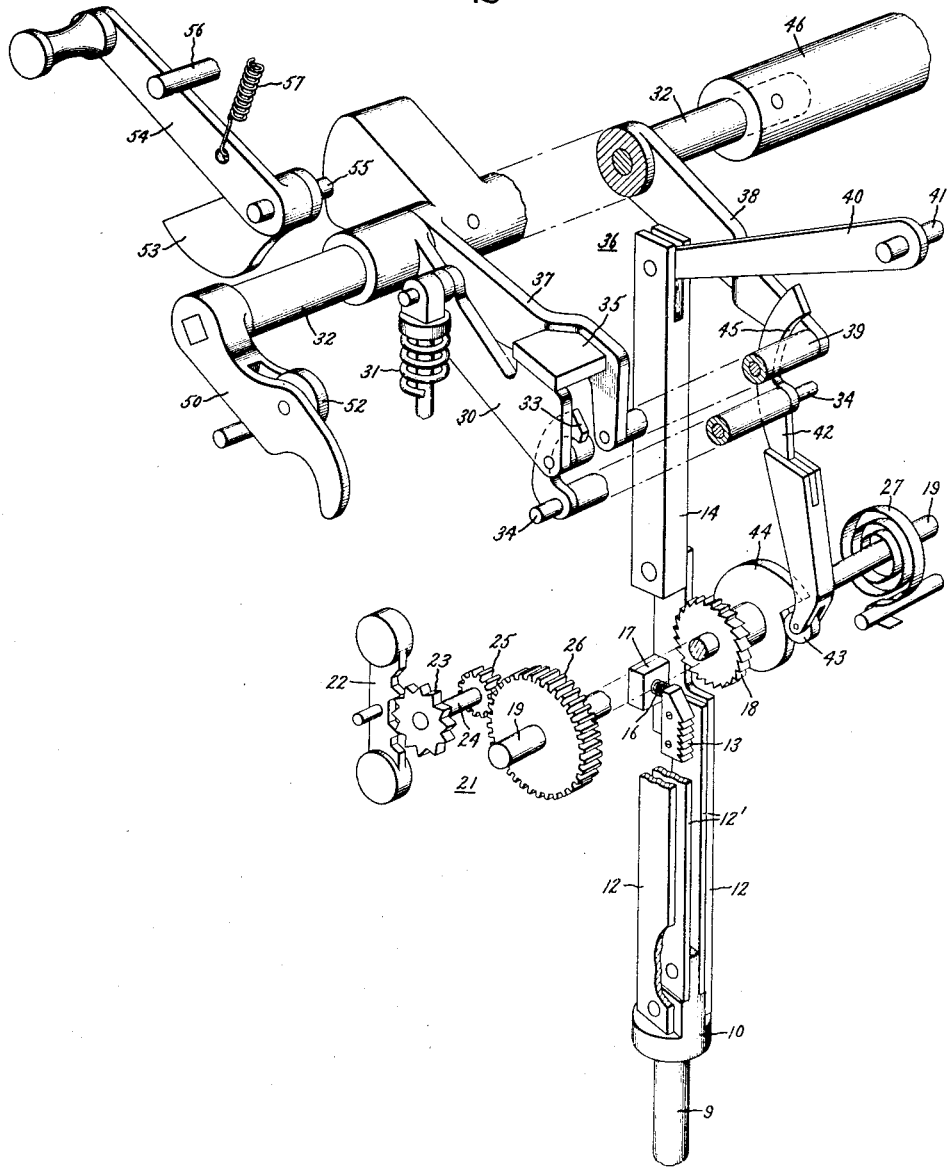

Patented July 12, 1949

2,476,076

UNITED STATES PATENT OFFICE 2,476,076

AUTOMATIC POLYPHASE RECLOSING CIRCUIT BREAKER

Ludwig S. Walle, Lansdowne, and Leonard J. Linde, Drexel Hill, Pa., assignors to General Electric Company, a corporation of New York Application April 17, 1944, Serial No. 531,420

7 Claims. (Cl. 200—89)

Our invention relates to automatic reclosing circuit interrupters and particularly to circuit interrupters of the aforesaid type which are particularly adapted for use on polyphase circuits.

Walle Patent 2,069,082, granted January 26, 1937 and assigned to the assignee of this application, discloses a single-pole reclosing circuit interrupter of the type wherein the reclosing operation is delayed for a predetermined time after the circuit interrupter is opened and the interrupter is locked in its open circuit position after a predetermined number of consecutive reclosures in the event of a persistent fault.

It is sometimes desirable to employ a single-pole reclosing circuit interrupter of the type disclosed in the aforesaid patent in series with each phase conductor of a polyphase circuit so that, in case of a fault, such as a ground, that involves only one phase conductor of the circuit, only the circuit interrupter in series with the faulted phase conductor is opened and reclosed. However, in the event that the fault is of a persistent character so that the single-pole reclosing circuit interrupter in series with the faulted phase conductor is locked in its open circuit position, it is also desirable to effect the opening of the single-pole circuit interrupters in the other phase conductors of the polyphase circuit so as to protect any polyphase apparatus that may be connected thereto.

One object of our invention is to provide an automatic reclosing mechanism for a plurality of single-pole reclosing circuit interrupters whereby each of the circuit interrupters may be opened and reclosed a predetermined number of times while the other circuit interrupters remain in their closed circuit positions and whereby all of the closed circuit interrupters are automatically opened and maintained in their open circuit positions when any one of the circuit interrupters has been opened a sufficient number of times to cause it to be locked in its open circuit position.

Figure 1:
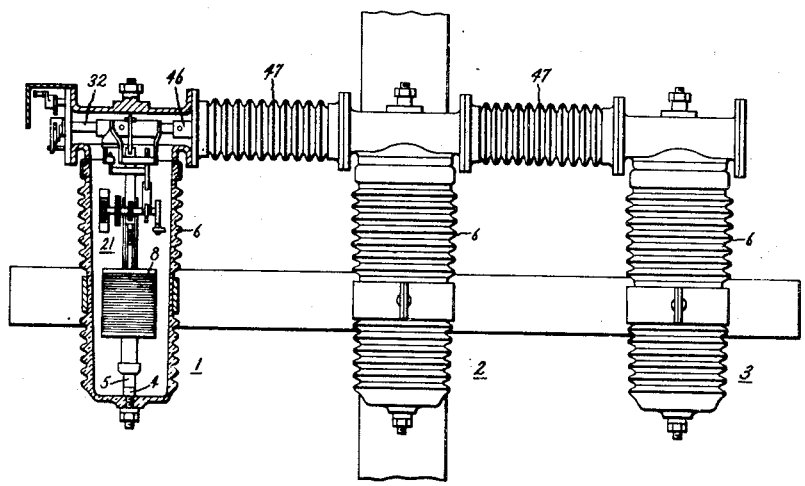
Figure 2:
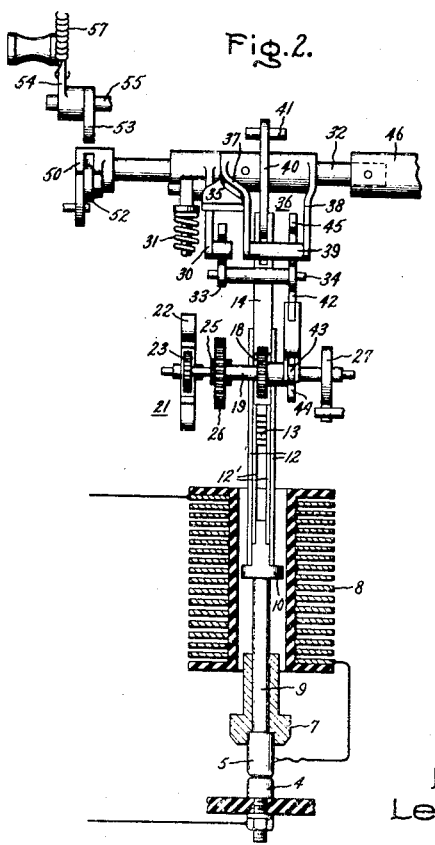

Our invention will be better understood from the following description when taken in connection with the accompanying drawing, Fig. 1 of which is a side elevation of a triple-pole automatic reclosing circuit interrupter embodying our invention with the casing of one of the poles broken away to show a side elevation of one of the three single pole interrupters, Fig. 2 of which is an enlarged view of the side elevation if the single pole circuit interrupter shown in Fig. 1, and Fig. 3 of which is a perspective view, partially in section, of one of the single pole circuit interrupters; and the scope of our invention will be pointed out in the appended claims.

In Fig. 1 of the accompanying drawings, we have disclosed an embodiment of our invention which is particularly adapted for use in a three-phase circuit. Three single-pole automatic reclosing circuit interrupters 1, 2 and 3 are shown, each being adapted for use in series with a different phase conductor of a three-phase circuit. Since the three circuit interrupters are similar in construction, only the details of one of the circuit interrupters are shown in Figs. 2 and 3 of the drawing in order to simplify the disclosure. Each interrupter comprises a stationary contact 4 and a cooperating movable contact 5, both of which are preferably immersed in an arc extinguishing and insulating liquid, such as oil, within a separate tank casing 6 as shown in Fig. 1. The movable contact 5 is operated by an armature 7 of a solenoid 8 which is connected in series with the contacts 4 and 5. The armature 7 is slidably mounted on a nonmagnetic contact rod 9 so that when the operating solenoid 8 is energized a predetermined amount the armature 7 is moved upwardly into engagement with a shoulder 10 on the contact rod 9 in order to effect a quick opening movement of the contact 5. Since the circuit of the solenoid 8 is interrupted by the separation of the contacts 4 and 5, gravity returns the contact 5 to its closed position after the opening operation of the interrupter has been completed. Suitable biasing means may also be provided for assisting gravity in restoring the contact 5 to its closed position.

For the purpose of retarding the reclosure of the circuit interrupter and for locking it in its open circuit position after a predetermined number of consecutive reclosures thereof, its contact rod 9 has mounted at the upper end thereof two upwardly extending spaced plates 12 and two stiffening plates 12' therefor which comprise a supporting frame for a pivoted ratchet member 13 and an upwardly extending insulating rod 14. A compression spring 16, seated between the ratchet member 13 and a block 17 rigidly secured to the frame 12, tends to bias the ratchet member 13 toward a coacting ratchet wheel 18 carried by a shaft 19 rotatably mounted in any suitable manner in the interrupter casing. The teeth of the ratchet member 13 and wheel 18 are arranged so that they engage and cause rotation of the shaft 19 only during the downward or closing stroke of the contact rod 9. In the open circuit position of the circuit interrupter, the teeth of the ratchet member 13 and wheel 18 are out of engagement.

The reclosing operation of the circuit interrupter is delayed by an escapement device 21 of the well-known oscillating type which comprises a pivoted oscillating member 22 that coacts with an escapement wheel 23 secured to a rotatable shaft 24. The shaft 24 also has mounted thereon a pinion gear 25 which meshes with a larger gear 26 secured to the rotatable shaft 19. A spiral spring 27 normally biases the shaft 19 in a clockwise direction towards its normal position in which it is shown.

The lock-out device of each single pole circuit interrupter comprises an operating arm 30 normally biased by means of an operating spring 31 for rotation in a counterclockwise direction about a shaft 32. Normally, when the circuit interrupter is not in its locked open circuit position, the arm 30 is in a set position, which is the position in which it is shown, and in which the spring 31 is prevented from moving the arm 30 from its set position by a hook-type latch 33 which is rigidly secured to a rotatable shaft 34. The arm 30 is arranged to engage a projection 35 on a releasing member 36 which is rigidly secured to the rotatable shaft 32 so that, when the arm 30 is moved in a counterclockwise direction by the operating spring 31, the shaft 32 and the releasing member 36 are also rotated in a counterclockwise direction. The releasing member 36 comprises two parallel arms 37 and 38 between which the insulating rod 14 is free to move up and down. The releasing member 36 also is preferably counterbalanced so that it is in equilibrium around its shaft 32 and therefore is not affected by shocks. The outer ends of the arms 37 and 38 are connected by a cross pin 39, which, when the releasing member 36 is moved in a counterclockwise direction, is arranged to engage a link 40, one end of which is pivoted to the upper end of the movable rod 14 and the other end of which rotates about a fixed pivot 41. Therefore, whenever the latch 33 is released, the associated operating spring 31 rotates the shaft 32 and the releasing member 36 of the lock-out mechanism in a counterclockwise direction so that it engages the link 40 and moves it clockwise about the fixed pivot 41 thereby causing the rod 14 and the movable contact 60 to be moved upwardly to the fully open position of the circuit interrupter if it is not already in that position.

The operation of the lock-out device of a single pole circuit interrupter such as 1, for instance, after this single pole circuit interrupter has been successively reclosed a predetermined number of times, is effected by means of an arm 42 which is rigidly secured to the rotatable shaft 34 and which carries at its lower end a roller 43 that bears against the surface of a cam 44 secured to the rotatable shaft 19. The face of the cam 44 is so shaped that, when the shaft 19 is rotated a predetermined angular amount in a counterclockwise direction from its normal position, the arm 42 and the shaft 34 are rotated sufficiently in a counterclockwise direction to release the latch 33 and allow the operating spring 31 to move the operating lever 30 upwardly and thereby rotate the shaft 32 in a counterclockwise direction. The pivotally mounted arm 42 also has a suitable cam surface 45 which is arranged to be engaged by the cross pin 39 of the associated releasing member 36 so that when the associated shaft 32 is rotated in a counterclockwise direction by a series of successive reclosing operations performed by another one of the single-pole interrupters, such as 2 for example, the shaft 34 is also moved in a counterclockwise direction to release the latch 33. The shafts 32 of the three single pole circuit interrupters are interconnected in any suitable manner as, for example, by suitable insulating rods 46 between the respective shafts 32 so that all of the shafts rotate as a unit. As shown in Fig. 1, the rods 46 may be respectively enclosed within suitable casings 47. Obviously, the shafts 32 could be one continuous shaft if it were so desired.

The operation of the embodiment shown in the drawing is believed to be obvious from the above description. When an overcurrent or short circuit occurs on a circuit containing any one of the single pole circuit interrupters 1, 2 or 3, its solenoid 8 attracts the associated armature 7 and causes an upward movement of the associated contact rod 9 and insulating rod 14 and the separation of the associated contacts 4 and 5. During this upward movement of the rod 9, the teeth of the associated ratchet member 13 do not operatively engage the teeth of the coacting ratchet wheel 18 to rotate its shaft 19 and cam 44 in a clockwise direction. However, when the movable contact rod 9 moves downwardly after the opening movement of the circuit interrupter has been completed, the teeth of the ratchet member 13 operatively engage the teeth of the ratchet wheel 18 so that the shaft 19 and the cam 44 are rotated in a counterclockwise direction against the bias of the spring 27. The escapement device 21 retards this counterclockwise rotation of the shaft 19 and cam 44 so that the downward or closing movement of the contact rod 9 is delayed. Near the end of the reclosing operation, the ratchet member 13 moves out of engagement with the ratchet wheel 18 so that the latter portion of the downward movement of the contact rod 19 is unretarded thereby insuring a quick positive reclosing of the contacts 5 and 6. Also, as soon as the ratchet member 13 disengages the ratchet wheel 18, the spring 27 starts to rotate the shaft 19 and the cam 44 in a clockwise direction, but this rotation is retarded by the escapement mechanism 21 so that if the circuit interrupter remains closed, the shaft 19 and the cam 44 are restored to their normal positions after a predetermined time interval.

In the event that the fault is not cleared when the movable contact 5 engages the stationary contact 4, the solenoid 8 of the circuit interrupter in the faulty circuit again effects the reopening of that circuit interrupter so that the above described operation is repeated and the shaft 19 and the cam 44 are rotated a further angular amount in a clockwise direction. After a predetermined number of successive reclosures, the cam 44 is rotated to a position in which the arm 42 and the shaft 34 are rotated sufficiently in a counterclockwise direction to release the latch 33. The operating spring 31 then moves the operating arm 30 and the releasing member 36 upwardly so that the cross pin 39 engages the associated link 40 to move and maintain the contact rod 9 of the associated circuit interrupter in its fully open position if it is not already in that position and to move the shafts 32 of all of the other circuit interrupters in a counterclockwise direction. This counterclockwise movement of the shafts 32 of the other single pole circuit interrupters, which are closed, produces an upward movement of the associated releasing members 36 so that their cross pins 39 engage the cam surface 45 of the associated pivotally mounted arms 42 and thereby rotate the associated shafts 34 to release the associated latches 33. The associated operating springs 31 are thereby released to move the operating arms 30 and the releasing members 36 of these other closed single pole circuit interrupters upwardly so as to effect an opening operation thereof.

The three single pole circuit interrupters may be simultaneously reset and reclosed from their locked out positions by rotating the shafts 32 in a clockwise direction by any suitable means. As shown, the shafts 32 are arranged to be rotated in a clockwise direction by means of an arm 50 secured to one of the shafts 32. The arm 50 carries a roller 52 which is arranged to be moved into engagement with the face of a cam 53 when the circuit interrupters are in their locked open position. The cam 53 is secured to a crank 54 which is rotatably mounted on a shaft 55 and which is normally held against a stop 56 by a spring 57 which tends to move the crank in a clockwise direction. The end of the crank 54 preferably extends outside of the circuit interrupter casing and is so shaped and positioned that it can be operated by means of an ordinary switch hook to cause counterclockwise rotation of the cam 53 and clockwise rotation of the arm 50 and shafts 32. When the shafts 32 are manually rotated in a clockwise direction in this manner, the projection 35 of each releasing member 36 causes the associated operating arm 30 to be rotated in a clockwise direction against the bias of the associated operating spring 31 until operating arm 30 is restored to its set position, in which position it is held by its associated latch 33. The clockwise rotation of each releasing member 36 also allows the associated movable contact rod 9 and movable contact 5 to be moved downwardly by gravity until the contact 5 engages the stationary contact 4. This downward movement however is retarded by the associated escapement device 21.

The circuit interrupters may be manually opened at any time by pushing the arm 50 upwardly with a switch hook so as to rotate the shafts 32 in a counterclockwise direction and thereby effect the release of all of the latches. Since the position of arm 50, which is located outside of the circuit interrupter casing, moves in accordance with the position of the circuit interrupter, it serves as a visual indicator of the circuit controlling position of the circuit interrupter.

While we have, in accordance with the patent statutes, shown and described one embodiment of our invention changes and modifications will be obvious to those skilled in the art, and we therefore aim in the appended claims to cover all such changes and modifications as fall within the true spirit and scope of our invention.

What we claim as new and desire to secure by Letters Patent of the United States is:

1. A circuit interrupter of the reclosing type comprising a plurality of contacts, a cooperating movable contact for each of said plurality of contacts and normally biased into engagement therewith, an electromagnet associated with each movable contact and connected in series therewith for moving the movable contact out of engagement with its associated cooperating contact, a movable shaft, an individual releasing member associated with each movable contact for maintaining the contact out of engagement with its associated cooperating contact, said releasing members being connected to said shaft so that they all move as a unit, an operating member associated with each releasing member for effecting the movement thereof and of said shaft in a predetermined direction, means for operating said operating members to effect said movement of said releasing members and shaft, and means responsive to a predetermined number of consecutive movements of any of said movable contacts by its associated electromagnet for rendering said means for operating said operating members operative.

2. A circuit interrupter of the reclosing type comprising a plurality of contacts, a cooperating movable contact for each of said plurality of contacts and normally biased into engagement therewith, an electromagnet associated with each movable contact and connected in series therewith for moving the movable contact out of engagement with its associated cooperating contact, a rotatable shaft, an individual releasing member associated with each movable contact for moving and maintaining the contact out of engagement with its associated cooperating contact, said releasing members being connected to said shaft so that they all rotate together as a unit, individual spring operated means associated with each releasing member for effecting the operation thereof, an individual latch associated with each spring operated means for normally rendering it inoperative, means responsive to a predetermined number of consecutive movements of a movable contact by its associated electromagnet for releasing its associated latch, and means responsive to a predetermined rotation of a releasing member for releasing its associated latch.

3. A circuit interrupter of the reclosing type comprising a plurality of contacts, a cooperating movable contact for each of said plurality of contacts and normally biased into engagement therewith, an electromagnet associated with each movable contact and connected in series therewith for moving the movable contact out of engagement with its associated cooperating contact, a rotatable shaft, an individual releasing member associated with each movable contact for moving and maintaining the contact out of engagement with its associated cooperating contact, said releasing members being connected to said shaft so that they all rotate together as a unit, individual spring operated means associated with each releasing member for effecting the operation thereof, an individual latch associated with each spring operated means for normally rendering it inoperative, an individual arm connected to each latch, means responsive to a predetermined rotation of a releasing member for operating the associated arm to release the associated latch, and means responsive to a predetermined number of consecutive closing movements of a movable contact for operating the associated arm to release the associated latch.

4. A circuit interrupter of the reclosing type comprising a plurality of contacts, a cooperating movable contact for each of said plurality of contacts and normally biased into engagement therewith, an electromagnet associated with each movable contact and connected in series therewith for moving the movable contact out of engagement with its associated cooperating contact, a rotatable shaft, an individual releasing member associated with each movable contact for moving and maintaining the contact out of engagement with its associated cooperating contact, said releasing members being connected to said shaft so that they all rotate together as a unit, individual spring operated means operatively associated with each releasing member so as to effect the rotation thereof in a predetermined direction and to be operated by the associated releasing member when it is rotated in the opposite direction, an individual latch associated with each spring operated means for normally rendering it inoperative, an individual arm connected to each latch, means responsive to a predetermined rotation of a releasing member for operating the associated arm to release the associated latch, an individual rotatable cam associated with each arm and arranged when rotated to a predetermined position from its normal position to effect movement of the associated arm whereby the associated latch is released, and means responsive to a closing movement of a movable contact for rotating the associated cam a predetermined amount toward said predetermined position.

5. A circuit interrupter of the reclosing type comprising a plurality of contacts, a cooperating movable contact for each of said plurality of contacts and normally biased into engagement therewith, an electromagnet associated with each movable contact and connected in series therewith for moving the movable contact out of engagement with its associated cooperating contact, a rotatable shaft, an individual releasing member associated with each movable contact for moving and maintaining the contact out of engagement with its associated cooperating contact, said releasing members being connected to said shaft so that they all rotate together as a unit, individual spring operated means associated with each releasing member for effecting the operation thereof, an individual latch associated with each spring operated means for normally rendering it inoperative, an individual arm connected to each latch, means responsive to a predetermined rotation of a releasing member for operating the associated arm to release the associated latch, an individual rotatable cam associated with each arm and arranged when rotated to a predetermined position from its normal position to effect movement of the associated arm whereby the associated latch is released, means responsive to a closing movement of a movable contact for rotating the associated cam a predetermined amount toward said predetermined position, and means for restoring each cam to its normal position with a delayed movement when the associated movable contact is in engagement with its associated cooperating contact.

6. A circuit interrupter of the reclosing type comprising a plurality of contacts, a cooperating movable contact for each of said plurality of contacts and normally biased into engagement therewith, an electromagnet associated with each movable contact and connected in series therewith for moving the movable contact out of engagement with its associated cooperating contact, a movable shaft, an individual releasing member associated with each movable contact for moving and maintaining the contact out of engagement with its associated cooperating contact, said releasing members being connected to said shaft so that they all move as a unit, an operating member associated with each releasing member for effecting the movement thereof and of said shaft in a predetermined direction, normally inoperative spring operated means for operating said operating members to effect said movement of said releasing members and shaft, means responsive to a predetermined number of consecutive movements of any of said movable contacts by its associated electromagnet for rendering said spring operated means operative, and manually operable means for rotating said shaft.

7. A circuit interrupter of the reclosing type comprising a plurality of contacts, a cooperating movable contact for each of said plurality of contacts and normally biased into engagement therewith, an electromagnet associated with each movable contact and connected in series therewith for moving the movable contact out of engagement with its associated cooperating contact, a rotatable shaft, an individual releasing member associated with each movable contact for moving and maintaining the contact out of engagement with its associated cooperating contact, said releasing members being connected to said shaft so that they all rotate together as a unit, individual spring operated means operatively associated with each releasing member so as to effect the rotation thereof in a predetermined direction and to be operated by the associated releasing member when it is rotated in the opposite direction, an individual latch associated with each spring operated means for normally rendering it inoperative, an individual arm connected to each latch, means responsive to a predetermined rotation of a releasing member for operating the associated arm to release the associated latch, an individual rotatable cam associated with each arm and arranged when rotated to a predetermined position from its normal position to effect movement of the associated arm whereby the associated latch is released, means responsive to a closing movement of a movable contact for rotating the associated cam a predetermined amount toward said predetermined position, and manually operable means for rotating said shaft.

LUDWIG S. WALLE.
LEONARD J. LINDE.

REFERENCES CITED

The following references are of record in the file of this patent:

UNITED STATES PATENTS

| Number | Name | Date |
|---|---|---|
| 1,593,476 | Speiser | July 20, 1926 |
| 1,611,779 | Read | Dec. 21, 1926 |
| 1,969,576 | Paxton | Aug. 7, 1934 |
| 2,096,544 | Jackson | Oct. 19, 1937 |
| 2,287,041 | Journeaux | June 23, 1942 |
| 2,322,301 | Lindstrom et al. | June 22, 1943 |
| 2,333,604 | Wallace | Nov. 2, 1943 |
| 2,374,001 | Derr | Apr. 17, 1945 |
| 2,390,735 | Pokorny | Dec. 11, 1945 |